United States Patent [19]

Schön

[11] Patent Number: 5,245,720
[45] Date of Patent: Sep. 21, 1993

[54] WINDSHIELD WIPER BLADE CARRYING A DEVICE FOR EJECTING A WASHING LIQUID

[75] Inventor: Wilfrid Schön, St. Etienne/Usson, France

[73] Assignee: Valeo Systemes d'Essuyage, Montigny-Le-Bretonneux, France

[21] Appl. No.: 896,189

[22] Filed: Jun. 10, 1992

[30] Foreign Application Priority Data

Jun. 11, 1991 [FR] France ............................ 91 07051

[51] Int. Cl.⁵ ........................... B60S 1/40; B60S 1/52; B60S 1/46
[52] U.S. Cl. .............................. 15/250.04; 15/250.32; 15/250.42
[58] Field of Search ........... 15/250.01, 250.02, 250.03, 15/250.04, 250.32, 250.35

[56] References Cited

U.S. PATENT DOCUMENTS

| 3,428,992 | 2/1969 | Di Giorgio | 15/250.04 |
| 3,432,876 | 3/1969 | Edwards | 15/250.04 |
| 3,440,678 | 4/1969 | Tibbet | 15/250.04 |
| 3,574,881 | 4/1971 | Temple | 15/250.04 |
| 3,913,167 | 10/1975 | Frigon | 15/250.04 |
| 4,133,071 | 1/1979 | Jaske | 15/250.35 |
| 5,016,312 | 5/1991 | Frimley | 15/250.04 |

FOREIGN PATENT DOCUMENTS

| 1902564 | 6/1970 | Fed. Rep. of Germany . | |
| 2942086 | 4/1981 | Fed. Rep. of Germany . | |
| 3907980 | 9/1990 | Fed. Rep. of Germany . | |
| 2119130 | 8/1972 | France . | |
| 2219860 | 9/1974 | France . | |
| 2379411 | 10/1978 | France | 15/250.04 |
| 0147946 | 9/1982 | Japan | 15/250.04 |
| 795483 | 5/1958 | United Kingdom | 15/250.04 |
| 2082051 | 3/1982 | United Kingdom | 15/250.04 |

Primary Examiner—Harvey C. Hornsby
Assistant Examiner—Gary K. Graham
Attorney, Agent, or Firm—Morgan & Finnegan

[57] ABSTRACT

A device for projecting a jet of washing liquid on to a glass surface of a motor vehicle is adapted to be fixed on a mounting member, having a U-shaped profile, which is part of a windshield wiper blade. The device is connected to a washing liquid reservoir and comprises a sealed housing which is at least partially fitted within the profile of the mounting member of the blade. The housing includes snap fit means for fitting it on a mounting pin, which is formed on the mounting member for securing the blade to the arm of the windshield wiper so that the housing is immobilised with respect to the mounting member. The housing also includes an inlet tube element for connection to the liquid reservoir, and at least one orifice for ejection of liquid on to the glass surface.

7 Claims, 2 Drawing Sheets

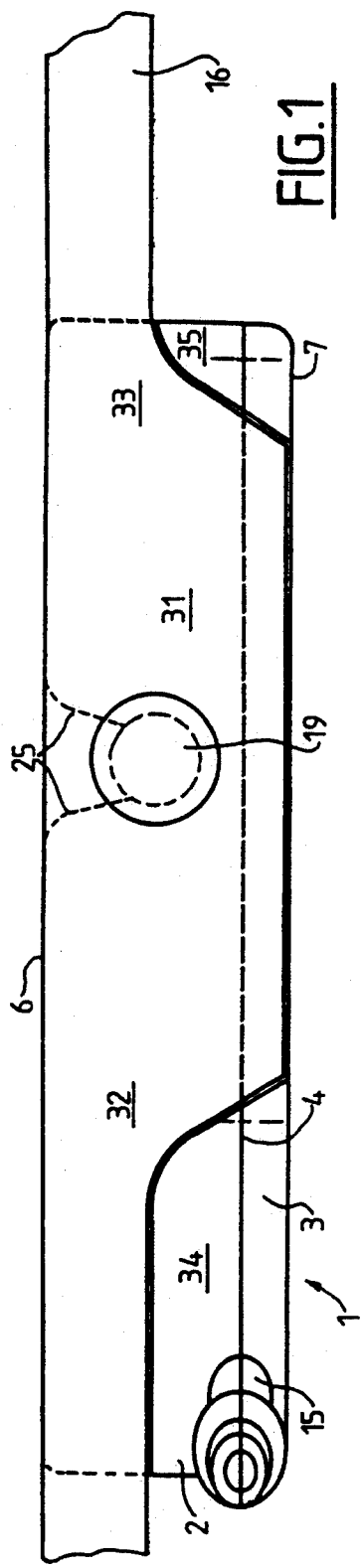
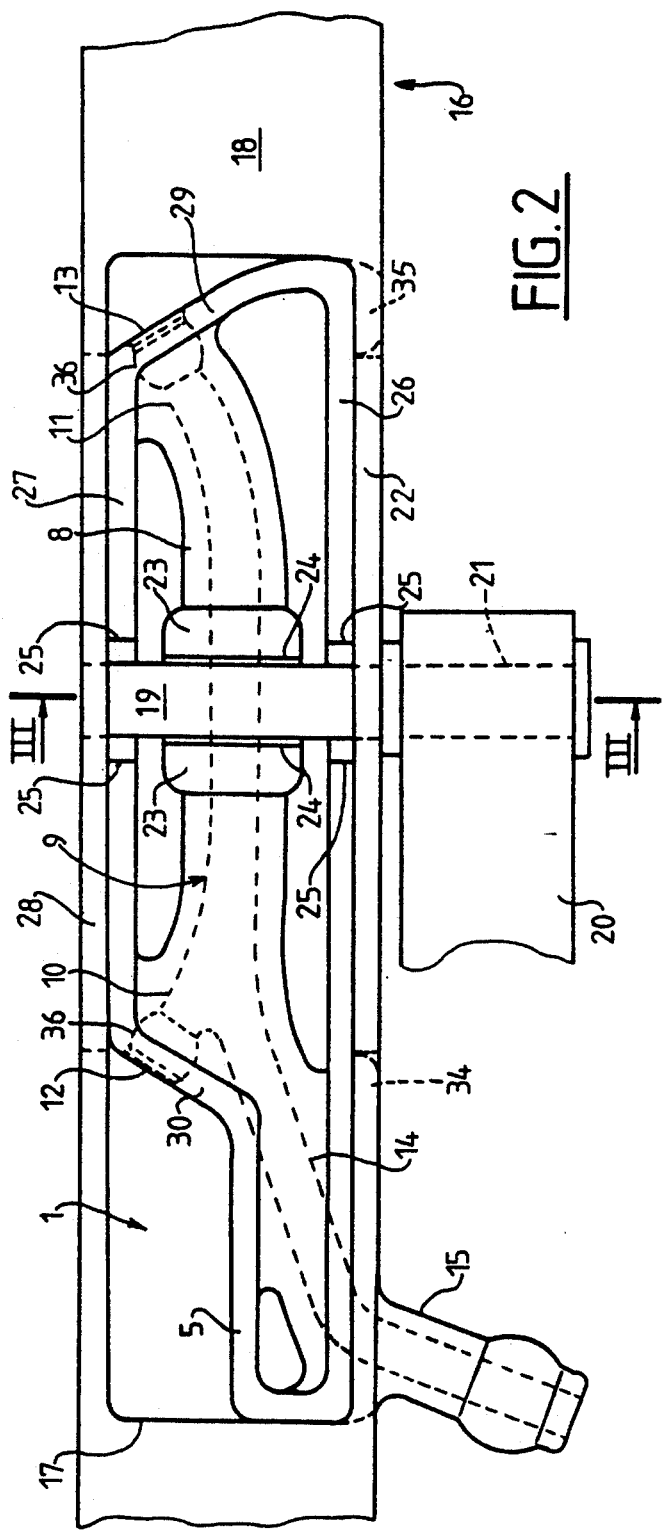

5,245,720

WINDSHIELD WIPER BLADE CARRYING A DEVICE FOR EJECTING A WASHING LIQUID

FIELD OF THE INVENTION

This invention relates to apparatus for cleaning glass surfaces in general, and in particular to windshield wipers for motor vehicles.

BACKGROUND OF THE INVENTION

Such apparatus conventionally comprises a jet nozzle which is secured on to the bodywork of the vehicle close to the glass to be cleaned, for example on the hood in the case where the glass is the windshield of the vehicle, the nozzle being oriented towards the glass. The nozzle is connected through a flexible feed tube to a reservoir for containing a washing liquid, and where necessary a pump is interposed between the reservoir and the nozzle for delivering the liquid to the latter. A windshield wiper, comprising an arm and a blade carried by the arm, spreads the liquid, which is projected by the nozzle, over the surface of the glass.

A drawback of this system is that all or part of the jet of liquid may be diverted, in particular by the wind, and may not ever reach the glass. In order to overcome this drawback, systems are provided in which the feed tube which supplies the washing liquid is arranged to extend along the windshield wiper arm, its terminal end being fixed to the wiper blade and orientated towards the glass in such a way as to give a direct jet of liquid which is very short and which will therefore be sure to impinge on the glass. This arrangement is however ugly in appearance, and also necessitates special fitting operations in order to ensure correct positioning of the free end of the feed tube.

DISCUSSION OF THE INVENTION

An object of the present invention is to overcome this drawback. To this end, the invention provides a device for ejecting liquid, which is adapted to be fixed on a mounting member having a U-shaped profile and forming part of a windshield wiper blade, the liquid ejecting device being connected to a washing liquid reservoir so as to deliver a jet of liquid towards the surface of a glass of a vehicle, the device being characterised in that it comprises a sealed housing which is adapted to fit at least partially within the profile of the mounting member, with the housing including means for cooperating with a mounting pin, which is carried by the mounting member for attaching the blade on the wiper arm, whereby to immobilise the housing with respect to the mounting member, the device further including means for connecting it to the washing liquid reservoir and at least one orifice for ejection of the liquid.

Use of the device in accordance with the invention is made possible, in particular, by virtue of the fact that it makes space available internally of the armature of the wiper blade around the mounting pin, when this mounting pin is extended outside the armature so as to receive the end of the wiper arm in the manner described, for example, in the specification of French published patent application No. FR 2 219 860A.

Preferably, the means cooperating with the pin comprise at least one groove defining a seating for the pin and forming an embracing means which are adapted to retain the pin in the seating, the walls of the groove being resiliently deformable so as to enable the pin to be introduced into the seating.

The housing may also include means cooperating with the profile of the mounting member for immobilising the housing against rotation about the pin.

In one preferred form of the invention, the connecting means comprise an inlet tube element on which a flexible feed tube can be fitted for supplying liquid from the reservoir.

The housing preferably comprises two components of plastics material assembled together in a sealed manner, namely a body member including the means cooperating with the pin, and a cover which is located on the side of the body member opposite to the base portion of the mounting member, with at least one of these two components defining a recess or hollow which is covered by the other one of the two said components so as to define an internal cavity of the housing. This cavity itself defines the path of the liquid between the connecting means and the orifice through which it is ejected towards the glass.

The two said components may, in particular, each be formed with a respective said recess, these recesses being located in register with each other so as to define the said cavity; while the inlet tube element may be in two halves, each of which is defined by a respective one of the two said components of the housing.

Further features and advantages of the invention will appear more clearly from the detailed description of a preferred embodiment of the invention which is given below, and which is given by way of example only and with reference to the accompanying drawings.

BRIEF DESCRIPTION OF THE DRAWINGS

FIG. 1 is a side view of a device in accordance with the invention, fitted in the mounting member of a windshield wiper blade.

FIG. 2 is a top view of the assembly shown in FIG. 1, also showing the hook of a windshield wiper arm engaged on the mounting pin of the blade.

DESCRIPTION OF A PREFERRED EMBODIMENT OF THE INVENTION

Figure 3:
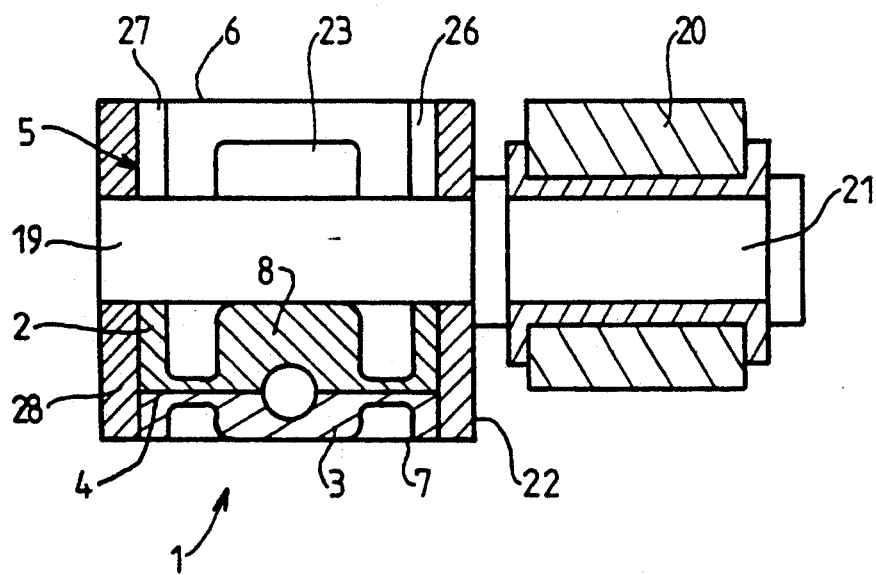
FIG. 3 is a view in cross section taken on the line III—III in FIG. 2.

The liquid ejection device shown in the drawings comprises a housing 1 which is made in two pieces of plastics material, namely a body 2 and a cover 3, which are assembled together, adhesively or by welding, along a junction plane 4. The housing 1 has a cylindrical, tubular wall 5, the generatrix of which is at right angles to the junction plane 4. The bases of the cylindrical wall 5 are of complex form and are contained in the planes 6 and 7, which are parallel to the junction plane 4 and which lie on opposite sides of the latter.

The housing also includes a core element 8 which is located inside the wall 5 and which is joined to the latter. In the core element 8 is formed a cavity 9 having two branches 10 and 11, the ends of which are open on the outside of the housing via respective orifices 12 and 13 in the outer face of the wall 5, together with a third branch 14 which extends through the wall 5 and is extended outwardly of the latter in a tubular inlet nose 15 of the housing, which projects outwardly of the wall 5. The branch 14 is open through the outer end of the nose 15. The cavity 9 and the nose 15 are symmetrical with respect to the junction plane 4, the cavity being defined by recesses or hollows formed in the two components 2 and 3, while one half of the inlet nose 15 is similarly defined by each of the components 2 and 3.

In the working position shown in the drawings, the housing 1 is partially located within the inverted U-shaped profile of the mounting member 16 of the windscreen wiper blade, facing towards a substantially rectangular aperture 17 which is formed in the base portion 18 of the profile of the member 16. The housing 1 extends along the blade on either side of a mounting pin 19 carried by the latter. The purpose of the aperture 17 is to enable the hook 20 of the wiper blade to be introduced when the latter is to receive the portion of the pin 19 lying within the profile of the mounting member 16 of the blade. However in the present case, the hook 20 of the blade surrounds a portion 21 of the pin 19 which projects out of the mounting member 16 and beyond one side, 22, of the latter, while the housing 1 is lodged int he space which is thus made available within the aperture 17 by partially surrounding the portion of the pin 19.

In a modified embodiment, the aperture 17 may of course be absent, with the base 18 therefore being continued along the whole length of the profile of the mounting member 16.

The core element 8 lies essentially below the pivot pin 19, and has a projecting element 23 adjacent to the pivot pin 19. The projecting element 23 extends upwardly from the pin 19, and is formed with a groove 24 which is open at the top for receiving the latter. Similarly, the tubular wall 5 has further slots 25, again open at the top, for receiving the pin 19.

In this description, unless otherwise indicated, the terms "below" and equivalent expressions indicate the side of the device nearer to the windshield in the working position of the windshield wiper, that is to say opposite to the base portion 18 with respect to the inverted U-shaped profile of the mounting member 16. Similarly, the term "longitudinal" refers to the longitudinal direction of the windshield wiper blade.

As can be seen in FIG. 1, the edges of the grooves 24 and/or 25 are so designed as to surround the mounting pin 19 narrowly over a little more than one half of its circumference in the vicinity of the base of the grooves. The width of these grooves is greater than the diameter of the pin 19 from their open upper ends to the vicinity of the contact zones. The pin 19 may this be easily inserted into the grooves and immobilised in the base of the latter by means of a releasable snap fit.

A tubular wall 5 has two flat portions 26 and 27, which are parallel to the longitudinal sides 22 and 28 of the blade mounting 16. These parallel portions 26 and 27 bear respectively on the inner faces of the latter so as to immobilise the housing 1 in the transverse direction. The portion 26 extends over substantially the whole length of the housing 1, while the portion 27 extends over a shorter length. Two oblique portions 29 and 30 of the wall 5 are joined to this last mentioned portion 27.

The longitudinal sides 22 and 28 of the blade mounting 16 are of variable depth, measured from the base portion 18, this depth being at a maximum in a central region 31 which extends longitudinally on either side of the mounting pin 19. The depth of the sides 22 and 28 diminishes progressively in the regions 32 and 33 which lie longitudinally on either side of the region 31, so as to attain a minimum value which is substantially smaller than the maximum value over the major part of the length of the mounting member 16. The depth of the housing 1 corresponds substantially with the maximum depth of the mounting member 16, with the outer face of the base portion 18 and the lower edges of the sides 22 and 28 in the region 31 lying substantially in the planes 6 and 7 respectively. The portion 26 of the tubular wall 5 extends over a length which is greater than that of the central portion 31 of the mounting member 16. Bosses 34 and 35 are formed on the outer face of the wall portion 26, on either side of the region 31 and below the regions 32 and 33 respectively. The contour of the bosses 34 and 35 is complementary to that of the side 22, or wing, of the mounting member 16, thus preventing any rotation of the housing 1 about the pin 19.

The inlet nose 15 of the housing 1 projects from the boss 34, being therefore below the wing portion 22 of the mounting member 16. Its purpose is to receive the end of a flexible feed tube (not shown) that is connected to a windshield washing liquid reservoir through a pump. The nose 15 has a circumferential band for retaining the flexible tube. The liquid arriving through the flexible tube fills the cavity 9 and is ejected through nozzles (not shown) which are introduced through the orifices 12 and 13 and snap-fitted into widened portions 36 of the cavity, these widened portions being disposed adjacent to the orifices. Two jets are thus formed, at right angles to the oblique wall portions 29 and 30 and directed in opposite directions in the longitudinal sense, with both nozzles being beside the wing portion 28 of the mounting member 16, below which they pass into the regions 32 and 33 respectively to reach the windshield.

What is claimed is:

1. A windshield wiper blade assembly comprising:
   an elongated U-shaped mounting member having a pair of spaced apart sidewalls connected by a base, said wiper blade assembly having an interior area, the space between said mounting member sidewalls defining the interior area of said wiper blade assembly;
   an elongated mounting pin disposed transversely within said mounting member and extending through the sidewalls of said mounting member for securing the wiper blade assembly to a wiper arm;
   a liquid ejection housing mounted within said interior area on said mounting pin, said housing having a flow passage therein for fluid communication with a liquid reservoir, said housing having at least one orifice thereon in fluid communication with said passage for ejecting liquid from said reservoir; and
   means for immobilizing said housing within said interior area relative to the mounting pin and said blade assembly.

2. A windshield wiper blade assembly according to claim 1 wherein said liquid ejection housing includes a core member and a projecting member extending from said core member, said projecting member including a groove defining a seat for receiving said mounting pin, and a pair of resiliently deformable wall members on opposite sides of said grooves for engaging said mounting pin to secure the housing thereto.

3. A windshield wiper blade assembly according to claim 1 wherein said housing includes a peripheral wall having a predetermined height and wherein each of said mounting member sidewalls has a wall portion of maximum height, said maximum height being substantially the same as the height of the peripheral wall of said housing.

4. A windshield wiper blade assembly according to claim 3 wherein said means for immobilizing comprises a pair of spaced apart wall portions of said peripheral wall, each of which being parallel to one of said mounting member sidewalls and abutting against said one of the mounting member sidewalls so as to immobilize the housing in a direction along which the mounting pin extends.

5. A windshield wiper blade assembly according to claim 4 wherein each of said mounting member sidewalls has a center wall portion corresponding to said maximum height wall portion and a pair of end wall portions each having a smaller height than its respective center wall portion.

6. A windshield wiper blade assembly according to claim 4 wherein each mounting member sidewall further includes a center wall portion and a pair of end wall portions, each mounting member sidewall progressively decreasing in height from its center wall portion to its end wall portions so as to define a pair of lateral engagement edges.

7. A windshield wiper blade assembly according to claim 6 wherein one of said spaced apart wall portions of said housing peripheral wall includes a pair of boss members, each of said boss members having an edge portion which abuts against one of the engagement edges of said mounting member center wall portions to prevent rotation of the housing about the mounting pin.

* * * * *